United States Patent [19]

Wilson

[11] 4,136,634
[45] Jan. 30, 1979

[54] HOIST BRAKE WEAR INDICATOR
[75] Inventor: Walter Wilson, Westland, Mich.
[73] Assignee: Eaton Corporation, Cleveland, Ohio
[21] Appl. No.: 851,239
[22] Filed: Nov. 14, 1977
[51] Int. Cl.² .............................................. B66D 5/30
[52] U.S. Cl. ..................................... 188/1 A; 73/129;
254/168; 116/208
[58] Field of Search ....................... 116/114 Q, 114 R;
188/1 A; 254/168, 186 R; 340/52 A; 73/7, 129;
318/372

[56] References Cited
U.S. PATENT DOCUMENTS 1,212,981  1/1917  Maris ................................... 254/168
1,229,984  6/1917  Libby ................................... 254/168

FOREIGN PATENT DOCUMENTS 2353915  5/1975  Fed. Rep. of Germany ............. 73/129

Primary Examiner—S. Clement Swisher
Assistant Examiner—Denis E. Corr
Attorney, Agent, or Firm—J. Gordon Lewis

[57] ABSTRACT

A wear indicator for use with a brake having an actuation means. The wear indicator measures the gap between a friction member and the actuation means which is a function of the wear experienced by the friction member.

3 Claims, 4 Drawing Figures

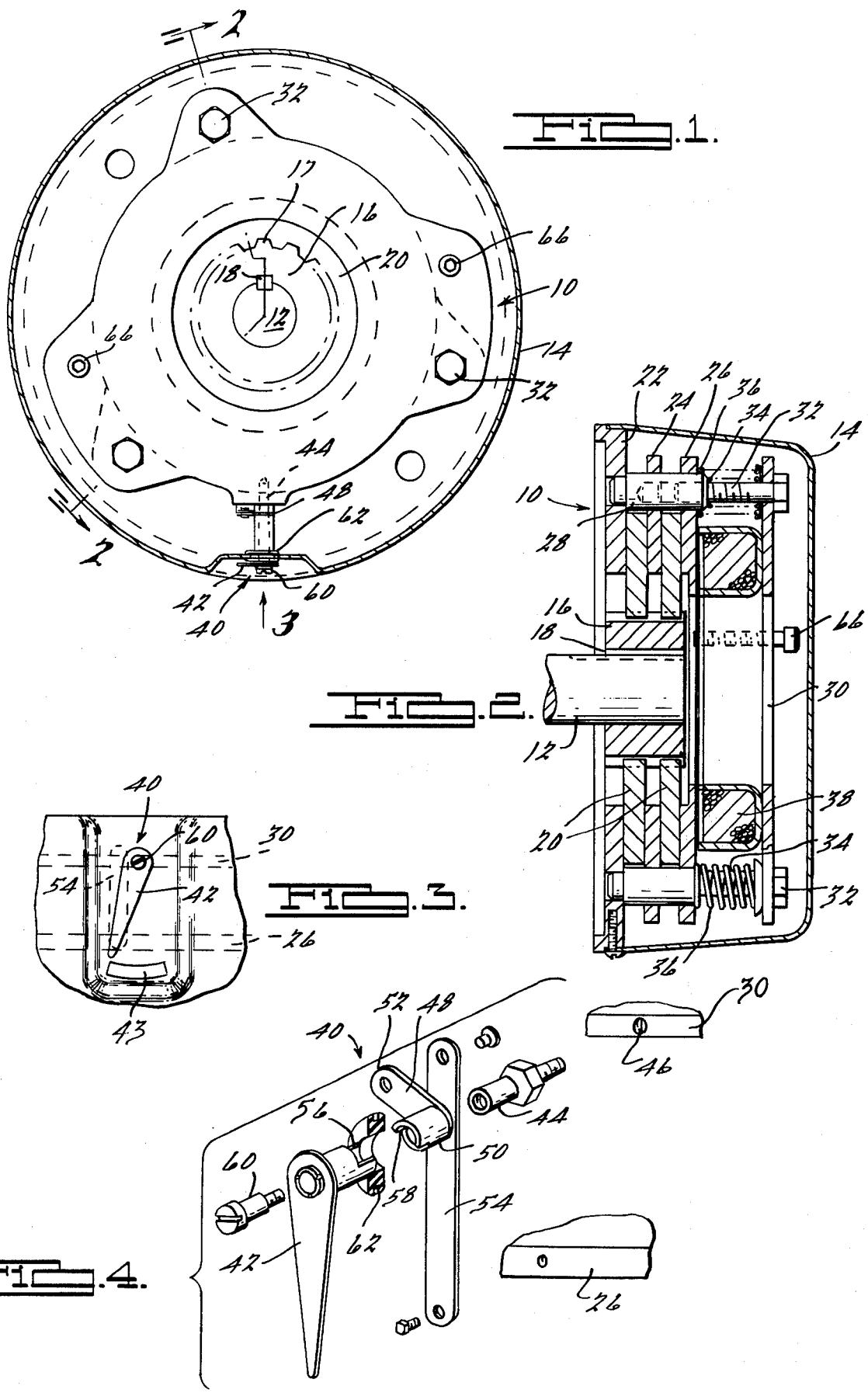

HOIST BRAKE WEAR INDICATOR

BACKGROUND OF THE INVENTION

1. Field of the Invention

In one aspect, this invention relates to wear indicators. In a further aspect, this invention relates to disc brake mechanisms.

2. Prior Art

Disc brakes, where discs attached to a shaft are frictionally engaged by complimentary stationary discs to stop the shaft, are known. Repeated engagement of the discs causes wear enlarging the gap between the discs when the discs are in a disengaged position. The enlarged distance or gap decreases the effectiveness of an electromagnetically actuated brake and will eventually result in a brake malfunction.

It would be desirable to have a wear indicator which provides an externally visible indication of the disc gap.

SUMMARY OF THE INVENTION

Briefly, a braking means for stopping a rotating shaft has at least one friction disc member rotationally mounted on the shaft. At least one annular friction member is radially disposed about the shaft and normally biased into engagement with the friction disc to prevent the friction disc from rotating. The annular member can be moved longitudinally along the shaft's axis to a position where the friction disc and annular member are not in frictional engagement and the shaft rotates freely. A wear indicator is attached to two members of the brake mechanism and displays the distance between the two selected members indicating the amount of wear the plates have undergone.

BRIEF DESCRIPTION OF THE DRAWING

In the accompanying drawing:

FIG. 1 shows an end view of a housing containing a brake; a portion of the housing is broken away to show a wear indicator;

FIG. 2 shows a sectional view taken along the line 2—2 of FIG. 1;

FIG. 3 shows a partial bottom view of the wear indicator as shown by sight line 3 in FIG. 1; and FIG. 4 is an exploded view of the wear indicator shown in FIGS. 1 and 3.

DETAILED DESCRIPTION OF THE PREFERRED EMBODIMENT

In the accompanying drawing, FIGS. 1 and 2 show a disc brake mechanism 10 which is attached to one end of an armature shaft 12 of an electric motor (not shown). The brake operates by stopping the rotation of the shaft when the electric motor is not operating. The brake mechanism 10 is installed within a housing 14 attached to the frame of an ordinary hoist such as those commonly known in the art as electrically driven hoists. Such hoists have an electric motor which rotates a drum. A cable or other load bearing member is connected to the drum and rotation of the drum allows loads attached to the cable to be moved to the desired position. Such hoists being common in the art, a further description is omitted in the interest of brevity.

As shown, the shaft 12 has an annular splined sleeve 16 mounted thereon, the splined sleeve being rotationally locked to the shaft by means of a key 18 and longitudinally by other means, such as a set screw.

Two friction discs 20 are mounted on the splined sleeve 16, the inner portion of the discs being shaped to engage the splines 17 but allowing the friction discs to move longitudinally along the axis of the splined sleeve.

Three annular plates 22, 24, 26 are disposed about the splined sleeve 16. One of the plates 22 is mounted securely to the brake housing 14 and the two remaining plates are mounted on three studs 28 which are securely fastened into the plate 22. The two plates 24, 26 can move axially along the studs 28 which are mounted with their axis parallel to the longitudinal axis of the shaft 12.

A magnet backing plate 30 is mounted on self-locking bolts 32 which engage complimentary threaded apertures in the studs 28, the bolts determining the maximum distance between the magnet backing plate and the annular plate 26.

A first set of spacing springs 34 have one end in contact with the magnet backing plate 30 and a second end in contact with an associated stud 28. The spacing springs 34 bias the magnet backing plate against the heads of bolts 32 and maintain the magnet backing plate at the maximum possible distance from the closest annular plate 26. A second set of activating springs 36 have one end contacting the magnet backing plate 30 and the other end mounted against an annular plate 26. The activating spring 36 normally biases the annular plates 22, 24, 26 and friction discs 20 axially into engagement, thereby braking or preventing the shaft 12 from rotating.

An annular electromagnet 38 is rigidly mounted on the magnet backing plate 30 and is adapted to exert a magnetic force, which overcomes the biasing force of the activating spring 36, pulling the annular plate 26 axially away from the remaining plates and discs. When the annular plate 26 has been drawn to the electromagnet 38, the friction discs 20 are free to rotate. When the electromagnet is de-energized, the activating springs 36 will force the annular plate 26 axially towards the plate 22 at the end of the brake housing 14 activating the brake 10.

As the annular plates and/or the friction discs wear, the gap between the closest annular plate 26 and the electromagnet 38 will increase. The wear indicator 40 of this invention will measure this wear and externally signal the degree of the separation. When the gap reaches a predetermined level, the gap should be adjusted to maintain proper brake performance. As shown in FIG. 3, an indicator arm 42 shows that the gap is at the minimum proper gap between the electromagnet 38 and the closest annular plate 26 when the brake is in an engaged position. As the gap widens, due to wear, the arm will rotate counterclockwise. If desired, the area 43, behind the arm 42, can be various colors so that it is readily apparent when the brake 10 should be adjusted.

The full structure of one wear indicator of this invention is shown in greater detail in FIG. 4. A threaded stud 44 is mounted on the magnet backing plate 30 by means of a threaded aperture 46. A portion of the stud 44 extends radially outward from the magnet backing plate 30. A crank 48 has a first end 50 journaled on the extending portion of the stud 44, the crank being free to rotate on the stud. The other end 52 of the crank is attached to a bar 54 which is in turn rotatably attached to the annular plate 26. As the annular plate 26 and magnet backing plate 30 move relative to each other, the crank 48 will be rotated about the stud 44, the amount of rotation being directly proportional to the distance between the plates. The indicator arm 42 is also journaled on the stud 44 with the crank; the arm has a jaw coupling portion 56 which mates with a complimentary portion 58 on the crank 48 locking the indicator and crank together for rotational motion. This jaw coupling facilitates assembly and disassembly of the housing. A threaded bolt 60 engages a threaded aperture in the end of the stud 44 and holds the indicator and crank on the stud. A resilient grommet 62 mounted in the housing holds the indicator arm 42 and crank 48 in the proper position in housing 14 and provides a dust and liquid shield.

When the indicator 40 shows that the brake should be adjusted, the housing 14 is removed and the threaded bolts 32 are rotated into the complimentary apertures in the studs 28 thereby decreasing the distance between the electromagnet 38 and annular plate 26. This insures that the electromagnet 38 will attract the plate 26 and allow shaft 12 to rotate when the magnet is activated.

A manual means is provided for disengaging the brake 10. Threaded, self-locking screws 66 pass through apertures in plate 30 and engage complimentary threaded apertures in the plate 26. When the brake is engaged, the screws 66 are rotated until their heads engage the plate and then further tightened to draw the plate 26 towards the electromagnet 38 thereby disengaging the brake.

What is claimed is:

1. A brake adapted to stop the rotation of a driving shaft comprising:
   at least one friction disc attached to said shaft and extending radially therefrom, said friction disc adapted for rotation with said shaft and having limited longitudinal movement along said shaft;
   at least one annular friction member radially disposed about the shaft and adapted to move longitudinally along said shaft but rigidly mounted with respect to rotation and normally biased into engagement with said friction disc;
   a rigidly mounted magnet backing plate separated from said annular friction member;
   an electromagnet mounted on said magnet backing plate and adapted to move said annular friction member out of contact with said friction disc; and
   a wear indicator attached to said annular friction member and said magnet backing plate, said wear indicator measuring the gap between said annular friction member and said electromagnet and externally indicating the gap present to show the amount of wear on the annular friction member and friction disc said gap increasing in size with wear.

2. A brake adapted to stop the rotation of a driving shaft comprising:
   at least one friction disc attached to said shaft and extending radially therefrom, said friction disc adapted for rotation with said shaft and having limited longitudinal movement along said shaft;
   at least one annular friction member radially disposed about the shaft and adapted to move longitudinally along said shaft but rigidly mounted with respect to rotation and normally biased into engagement with said friction disc;
   a rigidly mounted magnet backing plate separated from said annular friction member;
   an electromagnet mounted on said magnet backing plate and adapted to move said annular friction member out of contact with said friction disc;
   a wear indicator attached to said annular friction member and said magnet backing plate, said wear indicator measuring the gap between said annular friction member and said electromagnet and externally indicating the gap present to show the amount of wear on the annular friction member and friction disc;
   a mounting plate rigidly affixed to a hoist frame;
   stud means attached to said mounting plate and extending through said annular friction member; and
   biasing means associated with said stud and said magnet backing plate, biasing said magnet backing plate into a plane parallel to the mounting plate.

3. A brake adapted to stop the rotation of a driving shaft comprising:
   at least one friction disc attached to said shaft and extending radially therefrom, said friction disc adapted for rotation with said shaft and having limited longitudinal movement along said shaft;
   at least one annular friction member radially disposed about the shaft and adapted to move longitudinally along said shaft but rigidly mounted with respect to rotation and normally biased into engagement with said friction disc;
   a rigidly mounted magnet backing plate separated from said annular friction member;
   an electromagnet mounted on said magnet backing plate and adapted to move said annular friction member out of contact with said friction disc;
   an arm having one end mounted to said annular friction member;
   a stud mounted on one edge of said magnet backing plate and extending radially from said edge, the stud having an external bearing surface;
   a crank having one end rotatably fastened to said arm and the opposed end journaled on said stud; and
   indicator means attached to said crank and adapted to move, externally indicating wear as said crank is rotated by said arm when said arm is moved due to changes in the gap between said electromagnet and said annular friction member.

* * * * *